United States Patent [19]

Lee

[11] Patent Number: 5,607,192
[45] Date of Patent: Mar. 4, 1997

[54] TUBING CONNECTION CONSTRUCTION FOR A WATER PURIFICATION SYSTEM

[76] Inventor: Shih-ping Lee, No. 1-4, Fute Lane, Taiping Rd., Taiping Hsiang, Taichung Hsien, Taiwan

[21] Appl. No.: 409,677

[22] Filed: Mar. 23, 1995

[51] Int. Cl.$^6$ .................................. F16L 37/00
[52] U.S. Cl. ........................... 285/305; 285/921
[58] Field of Search ................... 285/305, 921, 285/308

[56] References Cited

U.S. PATENT DOCUMENTS

| | | | |
|---|---|---|---|
| 4,244,608 | 1/1981 | Stuemky | 285/305 |
| 4,378,795 | 4/1983 | Feathers et al. | 285/305 |
| 4,423,892 | 1/1984 | Bartholomew | 285/305 |
| 4,541,657 | 9/1985 | Smyth | 285/305 |
| 4,591,192 | 5/1986 | Van Exel et al. | 285/305 |
| 4,721,331 | 1/1988 | Lemelshtrich | 281/305 |
| 4,813,716 | 3/1989 | Lalikos et al. | 285/305 |
| 4,832,378 | 5/1989 | Zepp | 285/305 |
| 4,869,534 | 9/1989 | Ketcham et al. | 285/305 |
| 4,991,880 | 2/1991 | Bernart | 285/305 |
| 5,092,300 | 3/1992 | Imoehl | 285/305 |
| 5,348,353 | 9/1994 | Deweerdt | 285/305 |
| 5,405,175 | 4/1995 | Bonnah, II et al. | 285/305 |

Primary Examiner—Eric K. Nicholson
Attorney, Agent, or Firm—Bacon & Thomas

[57] ABSTRACT

A tubing connection construction includes a fitting member having one end portion received in a passage defined in an apparatus. A flange portion is formed on a periphery of the end portion of the fitting member and protrudes radially and outwardly therefrom. An annular recess is defined in the periphery of the end portion of the fitting member and communicates with a slot defined in the apparatus, which communicates with the passage. A positioning member is received in the slot and includes a substantially C-shaped leg portion fitted in the annular recess of the fitting member such that the flange portion is stopped by the C-shaped leg portion, thereby fixing the fitting member to the apparatus.

3 Claims, 9 Drawing Sheets

TUBING CONNECTION CONSTRUCTION FOR A WATER PURIFICATION SYSTEM

BACKGROUND OF THE INVENTION

1. Field of Invention

The present invention relates to a tubing connection construction, and more particularly to a tubing connection construction for a water purification system.

2. Related Prior Art

Figure 10:
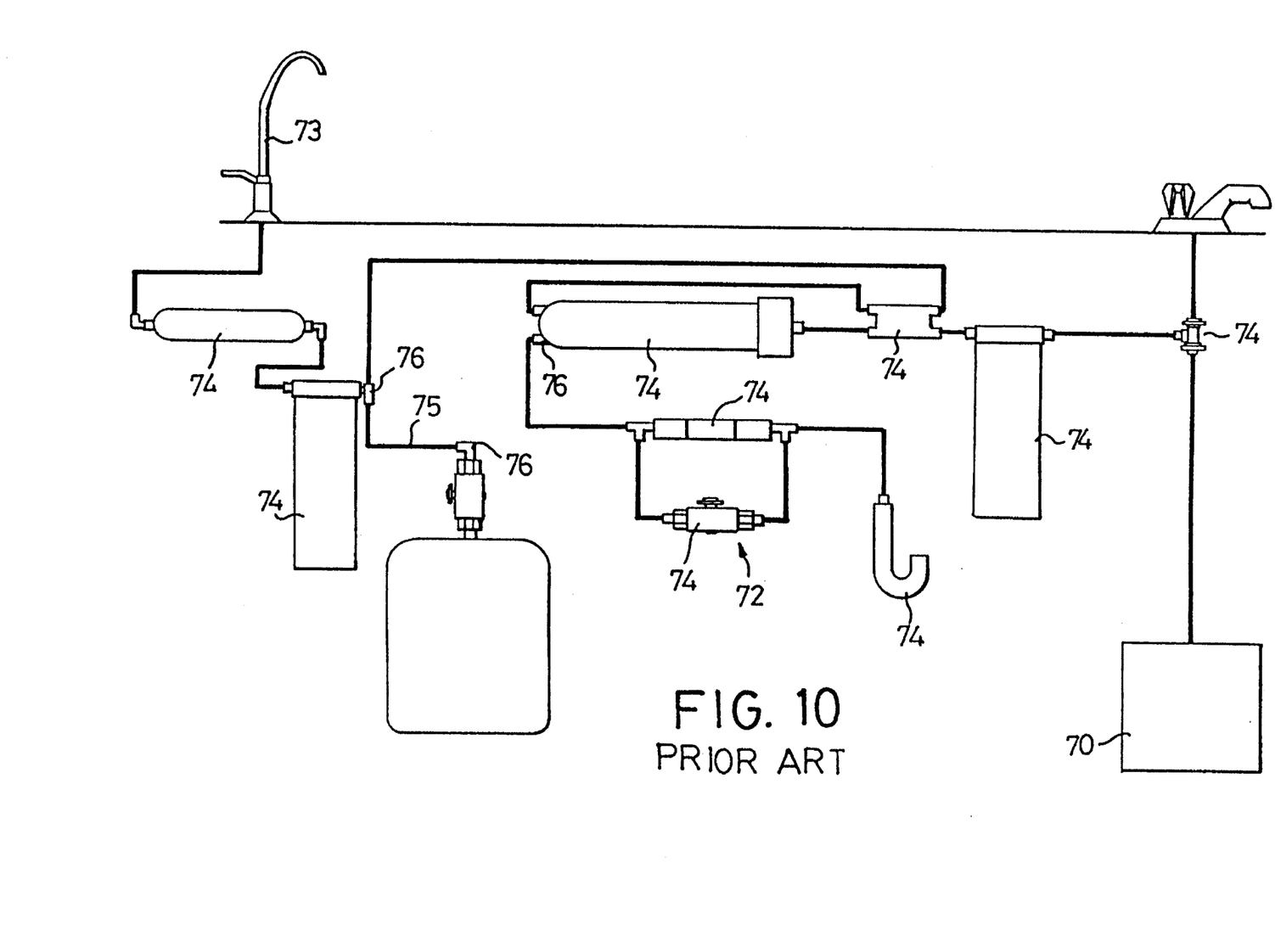
FIG. 10 is a flow chart of a water purification system in accordance with the prior art.
Figure 11:
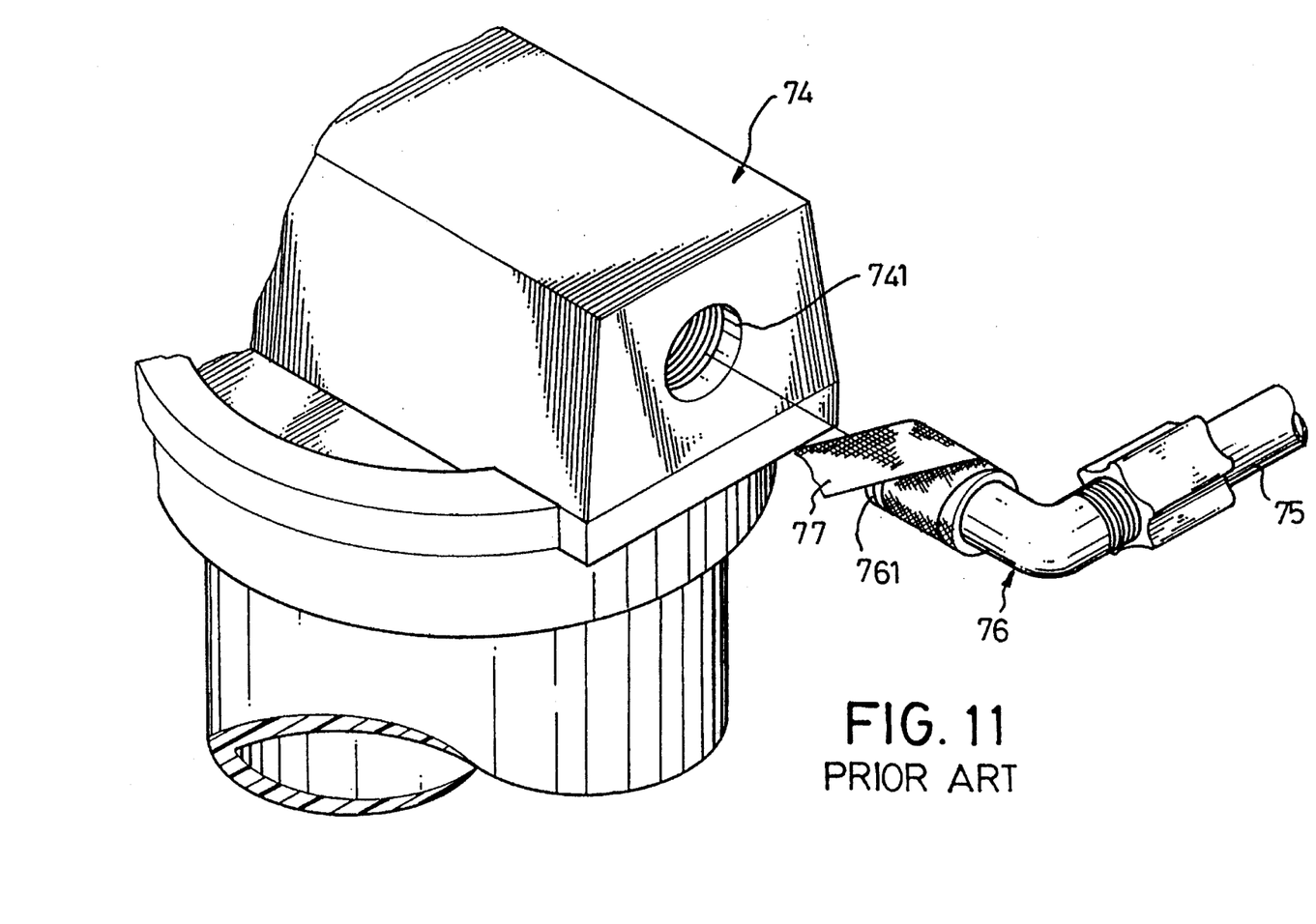
FIG. 11 is an exploded view of a tubing connection construction in accordance with the prior art.

A conventional tubing connection (or pipe fitting) construction for a water purification system is shown in FIGS. 10 and 11. However, by such an arrangement, there are still some shortcomings in the conventional tubing connection construction.

There will be a more complete and sufficient illustration in the detailed description of the preferred embodiments, concerning the conventional tubing connection construction.

The present invention has arisen to mitigate and/or obviate the disadvantages of the conventional tubing connection construction.

SUMMARY OF THE INVENTION

The primary objective of the present invention is to provide a tubing connection construction which is assembled easily, fast and reliably.

In accordance with one aspect of the present invention, there is provided a tubing connection construction for an apparatus which includes a lug portion laterally formed thereon and protruding outwardly therefrom. A passage is transversely defined in the apparatus and extends through the lug portion. A slot is vertically defined between the apparatus and the lug portion and communicates with the passage.

The tubing connection construction comprises a fitting member including a first end portion received in the passage and a second end portion. A flange portion is formed on a periphery of the first end portion of the fitting member and protrudes radially and outwardly therefrom to be retained in the passage in the apparatus. An annular recess is defined in the periphery of the first end portion of the fitting member adjacent to the flange portion and communicates with the slot.

A positioning member is received in the slot and includes a leg portion formed on a lower end thereof and fitted in the annular recess of the fitting member such that the flange portion of the fitting member is stopped by means of the leg portion of the positioning member, thereby fixing the fitting member to the apparatus.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Referring to FIGS. 10 and 11, a conventional tubing connection (or pipe fitting) construction in accordance with the prior art is provided for a water purification system. FIG. 10 is a flow chart of the water purification system 72 which is provided for filtering and purifying water supplied from a water source 70 so as to supply drinkable water to a faucet 73. The water purification system 72 comprises a plurality of apparatuses 74 such as filter housings etc., each of which is connected to a tube 75 by means of an associated fitting (or connector) 76. Referring to FIG. 11, each of the fittings 76 includes an outer thread 761 threadedly engaged in a threaded hole 741 defined in the apparatus 74, thereby fastening the fitting 76 to the associated apparatus 74. A thread seal tape 77 is wrapped around the outer thread 761 of the fitting 76, thereby preventing water in the apparatus 74 from leaking.

By such an arrangement, the fitting 76 is threadedly engaged with the apparatus 74, thereby limiting relative rotational movement between the fitting 76 and the apparatus 74, so easily bending or deforming the tube 75 when assembling/dismantling the fitting 76 to/from the apparatus 74.

Figure 1:
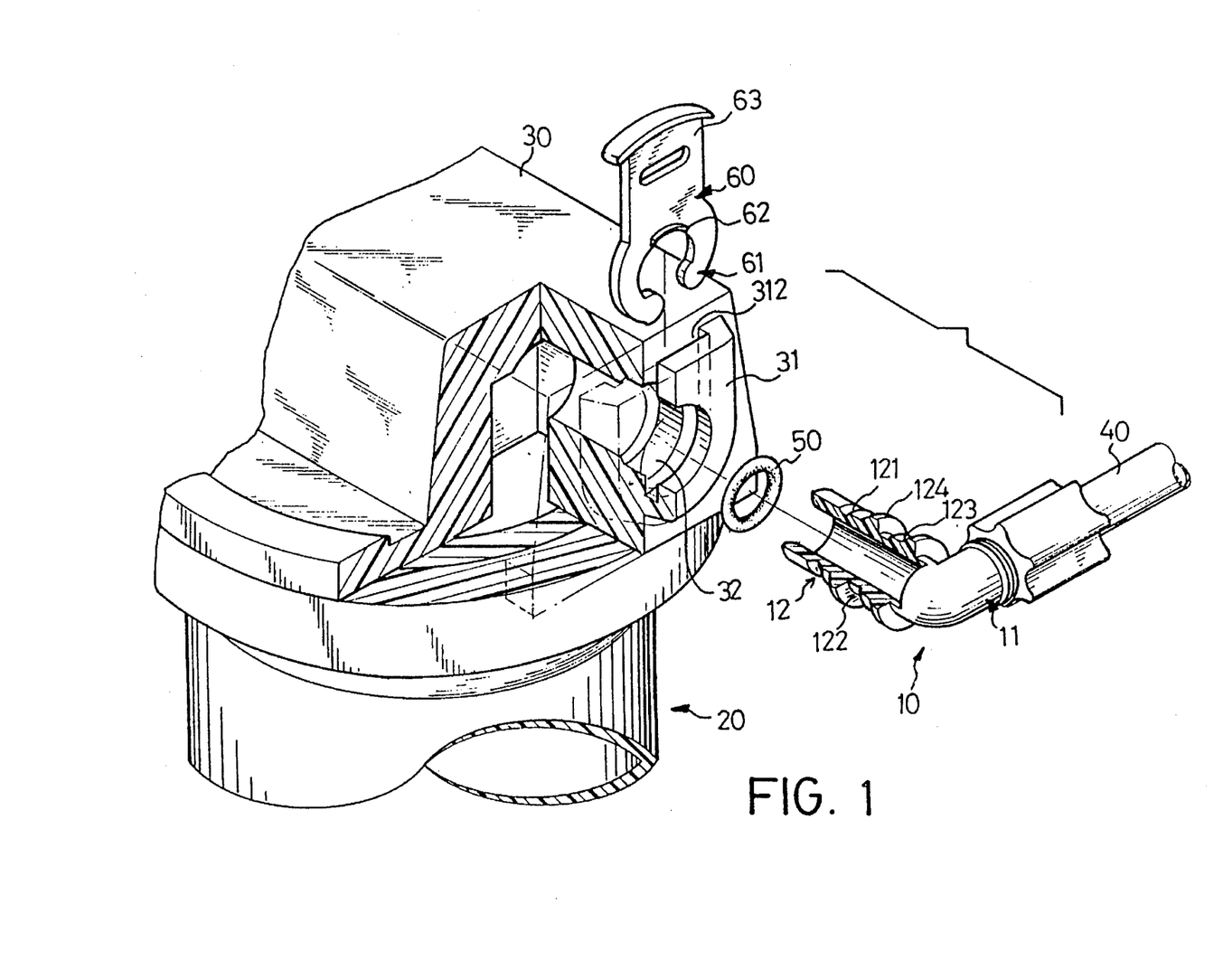
FIG. 1 is a partially cross-sectional exploded view of a tubing connection construction in accordance with the present invention.
Figure 2:
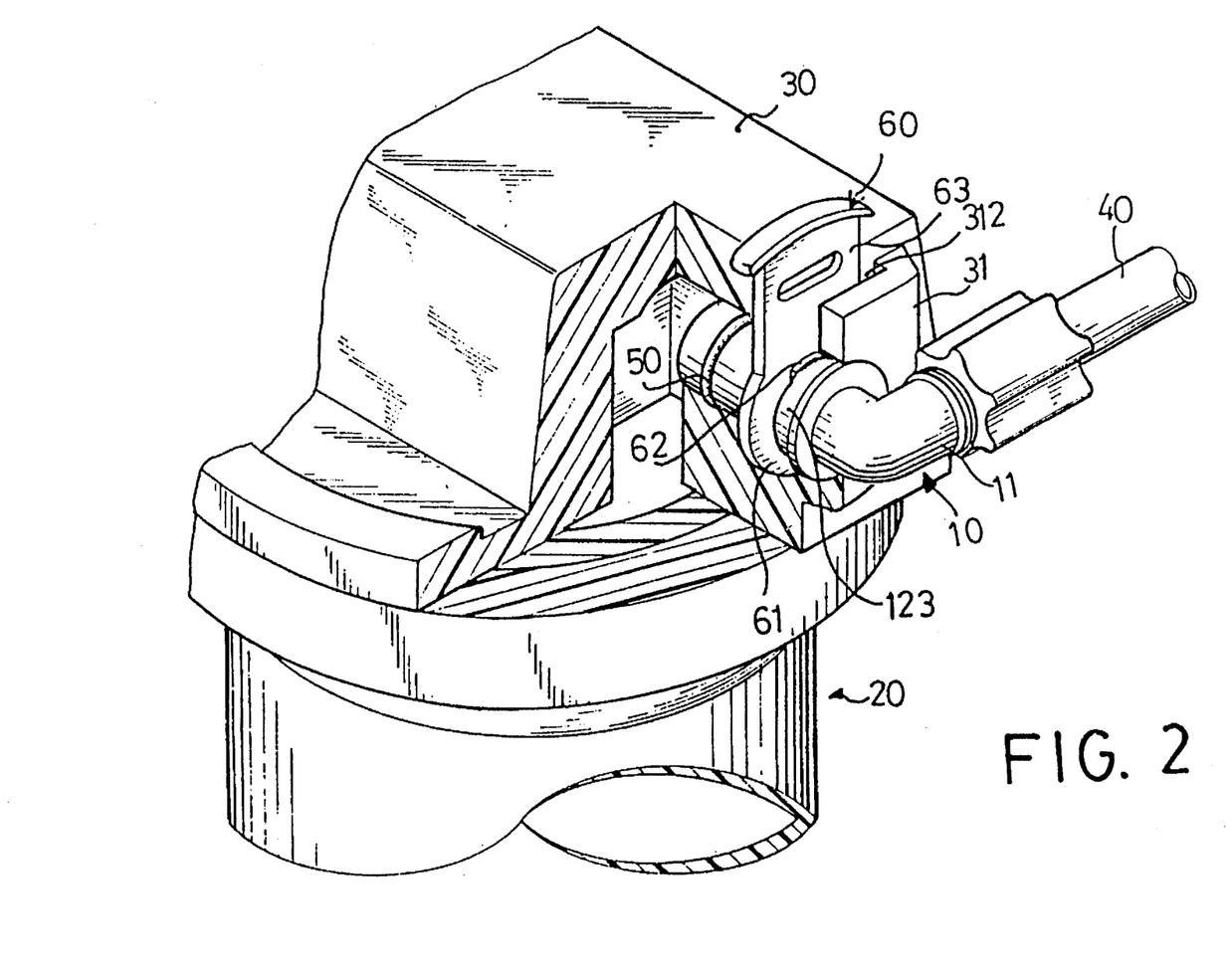
FIG. 2 is a partially cross-sectional assembly view of the tubing connection construction as shown in FIG. 1.
Figure 3:
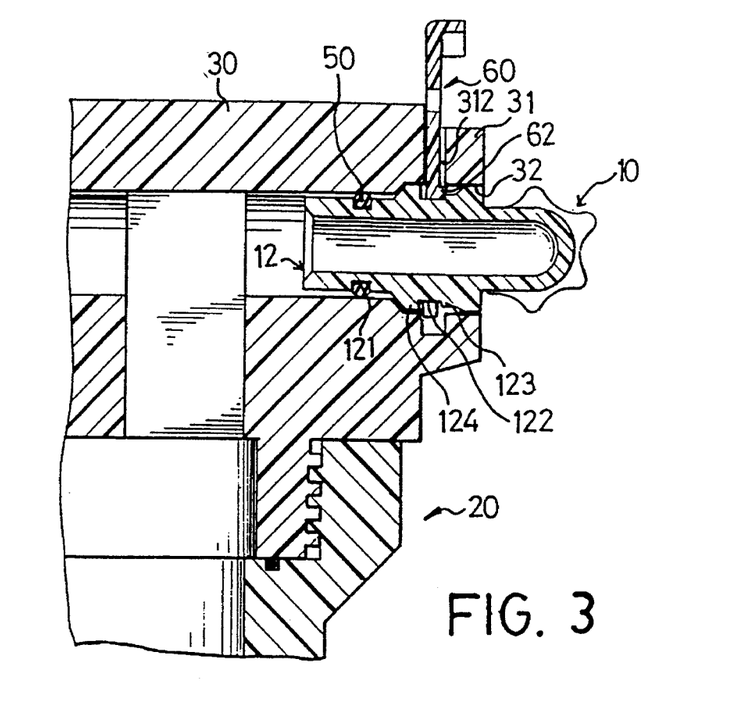
FIG. 3 is a front plan cross-sectional view of FIG. 2.
Figure 4:
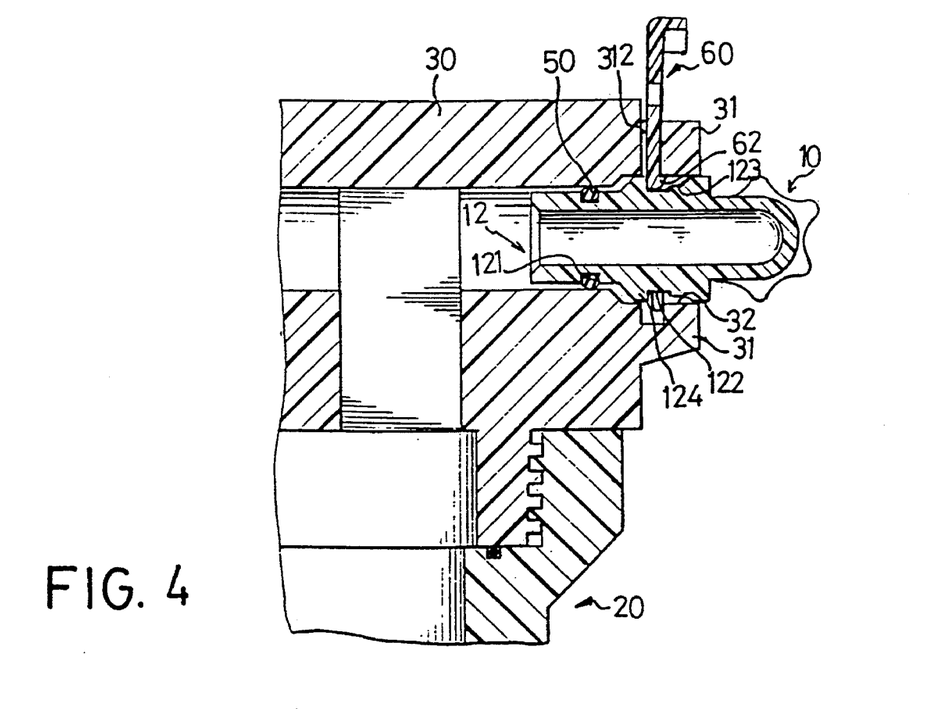
FIG. 4 is a front plan cross-sectional view of FIG. 2.

Referring to FIGS. 1–8, and initially to FIGS. 1 and 2 with reference to FIGS. 3 and 4, a tubing connection (or pipe fitting) construction in accordance with the present invention is provided for an apparatus 20 such as a filter housing etc., which is used for a water purification system and includes a cap 30 mounted on an upperside thereof. A lug portion 31 is laterally formed on the cap 30 and protrudes outwardly therefrom. An elongated passage 32 is transversely defined in the cap 30 and extends through the lug portion 31. A slot 312 is vertically defined between the cap 30 and the lug portion 31 and communicates with the passage 32.

The tubing connection construction comprises a substantially L-shaped fitting member (or connector) 10 including a first end portion 12 received in the passage 32 and a second end portion 11 connected to a tube 40. A flange portion 124 is formed on a periphery of the first end portion 12 of the fitting member 10 and protrudes radially and outwardly therefrom to be retained in the passage 32 in the cap 30. An annular recess 122 is defined in the periphery of the first end portion 12 of the fitting member 10 adjacent to the flange portion 124 and communicates with the slot 312.

A positioning member 60 is received in the slot 312 and includes an upper end 63 and a substantially C-shaped retaining portion (or leg portion) 61 formed on a lower end thereof and fitted in the annular recess 122 of the fitting member 10 such that the flange portion 124 of the fitting member 10 is stopped by means of the C-shaped retaining portion 61 of the positioning member 60, thereby fixing the fitting member 10 to the cap 30.

Preferably, a projection 123 is formed on the periphery of the first end portion 12 of the fitting member 10 and is received in the passage 32 in the lug portion 31 to abut on the C-shaped retaining portion 61 of the positioning member 60. It is to be noted that the annular recess 122 is located between the flange portion 124 and the projection 123.

In addition, an annular groove 121 is defined in the periphery of the first end portion 12 of the fitting member 10 and communicates with the passage 32 in the cap 30. A sealing washer 50 is mounted around the annular groove 121 and abuts on an inner wall (not labeled) of the cap 30 defining the passage 32 for preventing water in the apparatus 20 from leaking via the passage 32 of the cap 30.

The C-shaped retaining portion 61 of the positioning member 60 further comprises a snapping end 62 laterally formed on an upper portion thereof and abutting on an inner wall (not labeled) of the lug portion 31 defining the passage 32 as shown in FIGS. 3 and 4.

Figure 5:
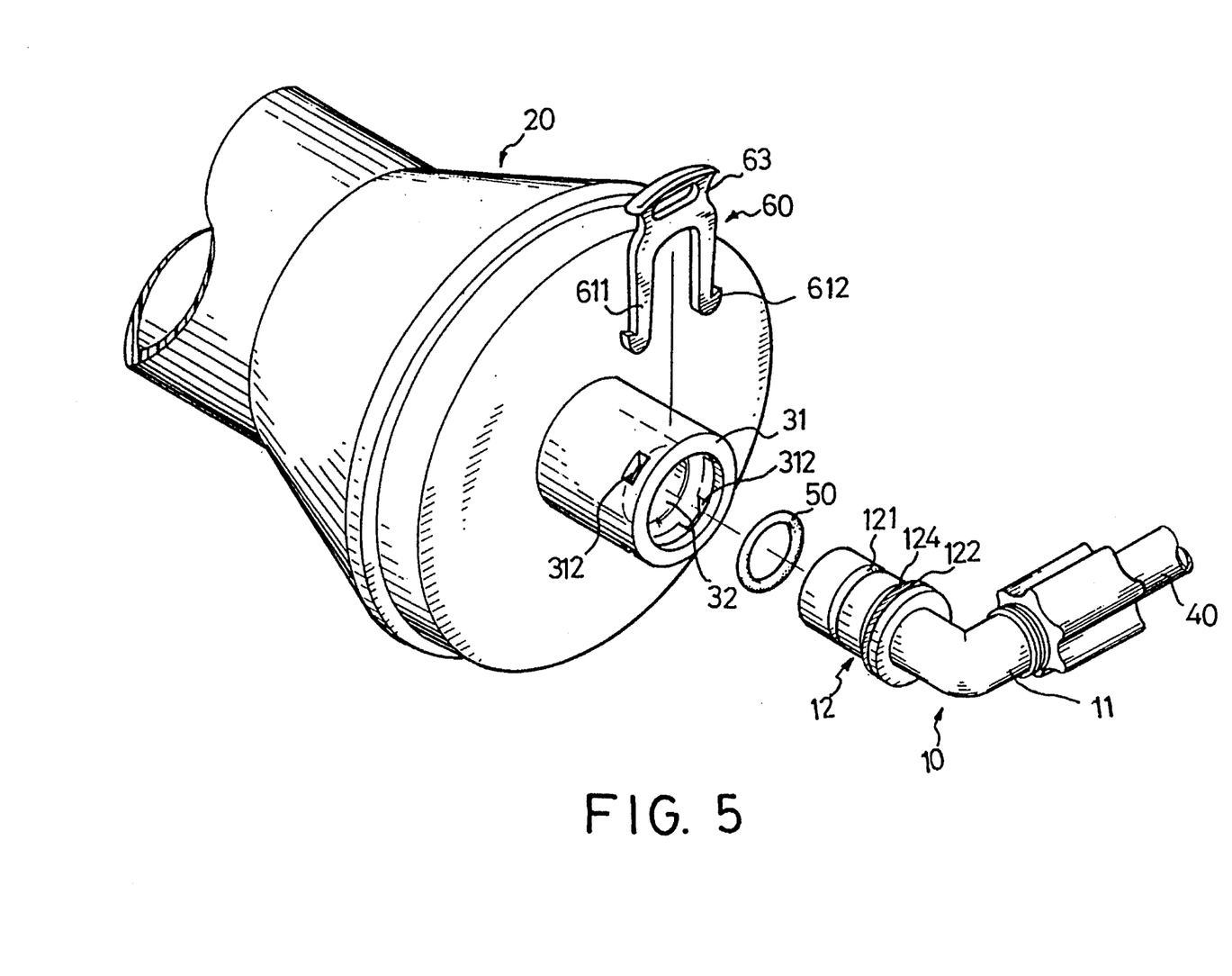
FIG. 5 is an exploded view of a tubing connection construction in accordance with a second embodiment of the present invention.
Figure 6:
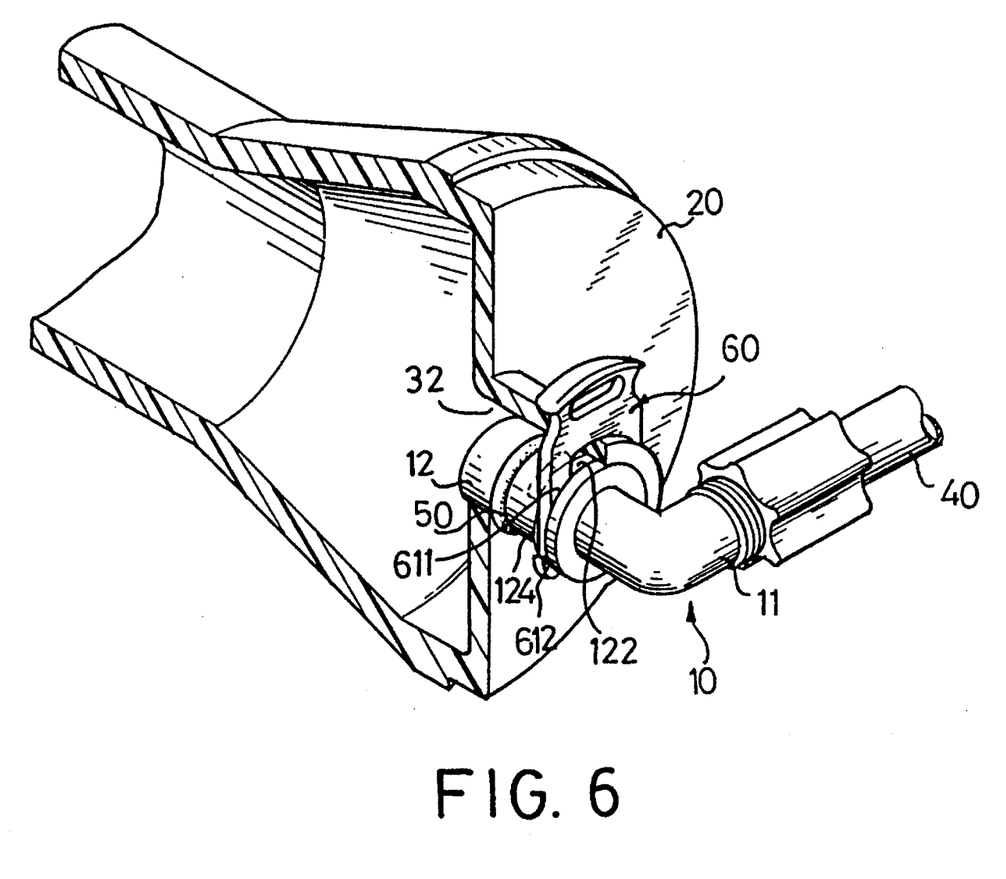
FIG. 6 is a partially cross-sectional assembly view of the tubing connection construction as shown in FIG. 5.
Figure 7:
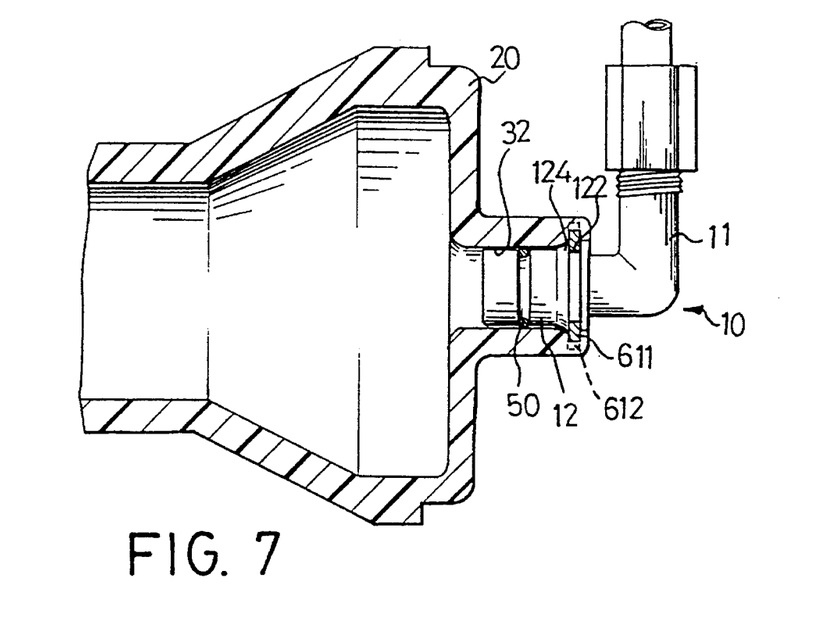
FIG. 7 is a top plan cross-sectional view of FIG. 6.

Referring to FIGS. 5–7, in accordance with a second embodiment of the present invention, the cap 30 is undefined, and the lug portion 31 is laterally formed on one distal end of the apparatus 20 directly. Two slots 312 are each vertically defined through one free end of the lug portion 31 and each communicate with the annular recess 122. The positioning member 60 comprises two legs 611 each extending through a corresponding one of the two slots 312 and each securely fitted in the annular recess 122 so as to limit movement of the flange portion 124 in the passage 32, thereby fixing the fitting member 10 to the apparatus 20.

Preferably, each of the two legs 611 has a hook end 612 laterally formed on a bottom portion thereof and extending outside of the associated slot 312 to be snapped on an underside of the lug portion 31, as best shown in FIG. 6. It is to be noted that the projection 123 is undefined.

Figure 8:
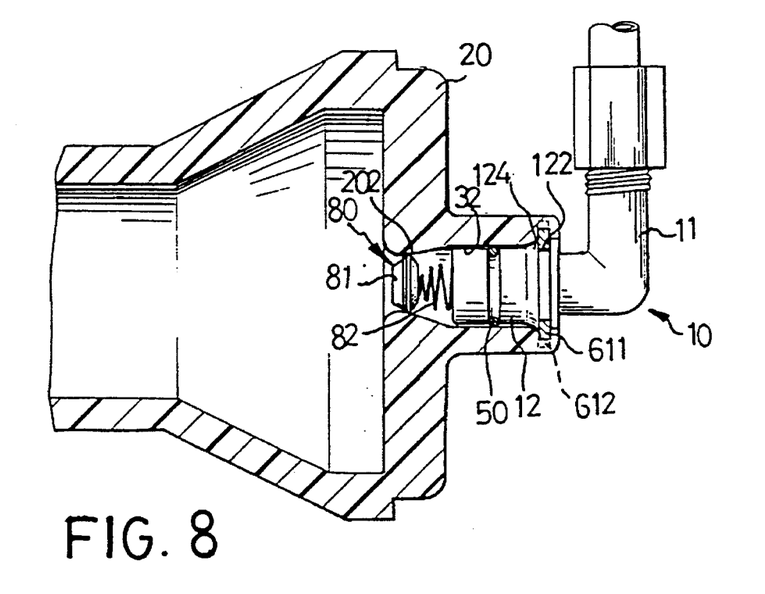
FIG. 8 is a top plan cross-sectional view of a tubing connection construction in accordance with a third embodiment of the present invention.

Referring to FIG. 8, in accordance with a third embodiment of the present invention, the passage 32 is substantially cone-shaped with a tapered surface. A stop member 80 comprises a valve 81 mounted in a reduced wall 202 of the distal end of the apparatus 20 and a spring 82 connected between the valve 81 and the first end portion 12 of the fitting member 10. By such an arrangement, water is able to flow forward through the valve 81 into the first end portion 12 of the fitting member 10 by pressing the valve 81 to bias the spring 82 and is prevented from flowing backward through the valve 81 due to a returning force of the spring 82.

Accordingly, the fitting member 10 is connected to the apparatus 20 or the cap 30 thereof essentially by means of the positioning member 60 being snapped into the annular recess 122 and is not threadedly engaged with the filter. Therefore, the fitting member 10 is freely rotated relative to the apparatus 20 or the cap 30 thereof by the tube 40, thereby preventing from bending or deforming the tube 40.

Figure 9:
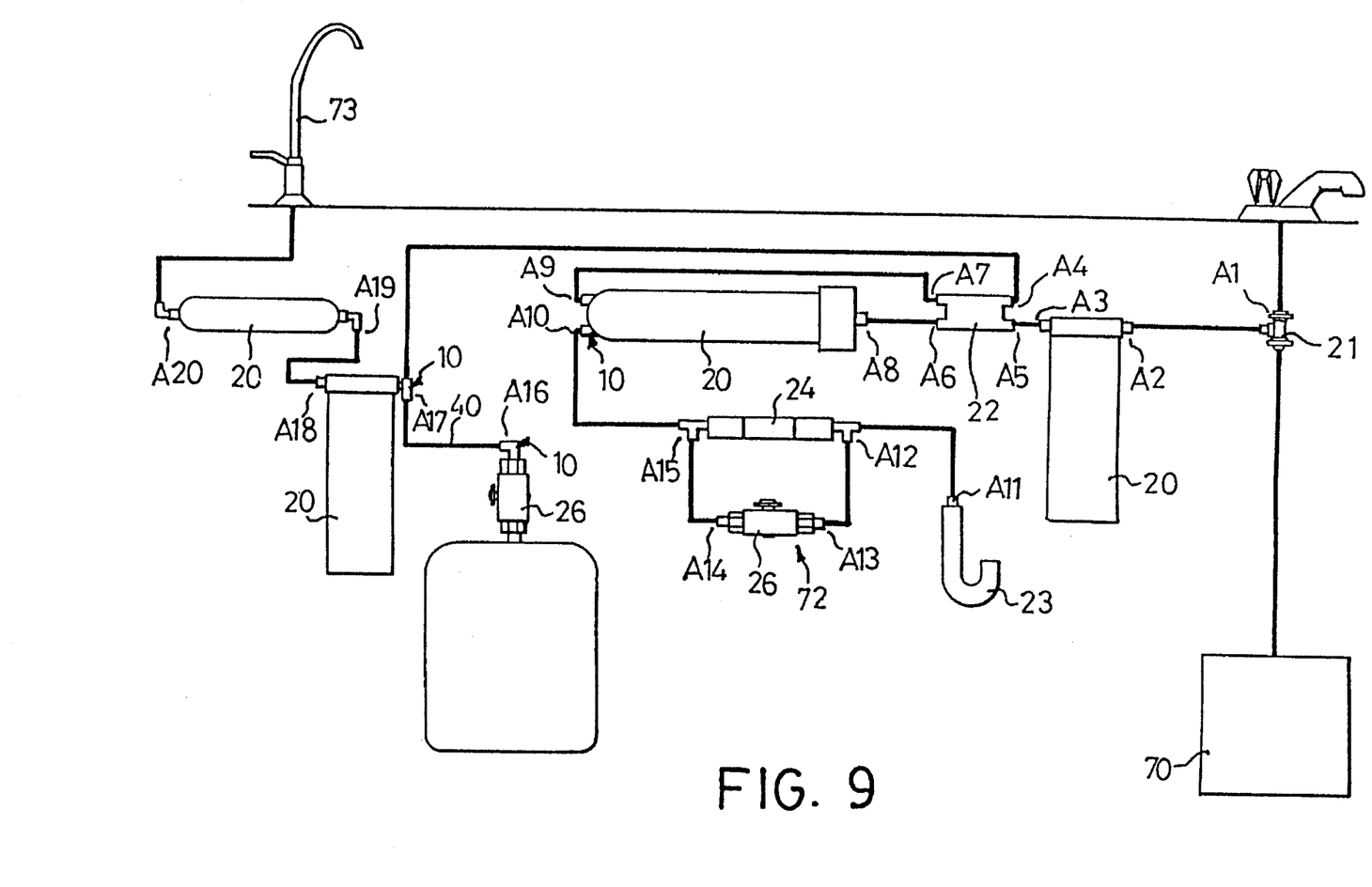
FIG. 9 is a flow chart of a water purification system in accordance with the present invention.

Referring to FIG. 9, the tubing connection construction is adapted for use in a water purification system 72 which is provided for filtering and purifying water supplied from a water source 70 so as to supply drinkable water to a faucet 73. The water purification system 72 comprises a plurality of apparatuses each of which is connected to a tube 40 by means of an associated fitting member 10. The apparatuses comprise components such as filter housings 20, an in-line feed valve 21, an auto shut-off 22, a drain saddle 23, a restrictor 24, and ball valves 26. The fitting member 10 is suitable for connecting each of the apparatuses to the tube 40.

In assembly, the water purification system 72 essentially comprises twenty connecting points from A1 to A20. By using the conventional tubing connection arrangement, i.e., using threaded and sealing engagement between the fitting 76 and the apparatus 74 by means of tools, the time required for assembling each of the fittings 76 and the associated apparatus is about thirty seconds such that the time required for assembling the twenty connecting points A1 to A20 is about 600 seconds.

On the contrary, by using a fitting member 10 cooperating with a positioning member 60 of the present invention, the time required for assembling each of the fitting member 10 and the associated apparatus is about three seconds such that the time required for assembling the twenty connecting points A1 to A20 is just about 60 seconds. It is apparent that the tubing connection construction of the present invention has an operating speed ten times faster than that of the conventional tubing connection arrangement, thereby greatly increasing the operating efficiency.

It should be clear to those skilled in the art that further embodiments of the present invention may be made without departing from the teachings of the present invention.

What is claimed:

1. A tubing connection construction for an apparatus which includes a lug portion (31) laterally formed thereon and protruding outwardly therefrom, a passage (32) transversely defined in said apparatus and extending through said lug portion (31), a slot (312) vertically defined between said apparatus and said lug portion (31) and communicating with said passage (32), said tubing connection construction comprising:

a fitting member (10) including a first end portion (12) received in said passage (32) and a second end portion (11), a flange portion (124) formed on a periphery of the first end portion (12) of said fitting member (10) and protruding radially and outwardly therefrom to be retained in said passage (32) in said apparatus, an annular recess (122) defined in the periphery of the first end portion (12) of said fitting member (10) adjacent to said flange portion (124) and communicating with said slot (312); and a C-shaped positioning member (60) received in said slot (312) and including a leg portion (61) formed on a lower end thereof and fitted in said annular recess (122) of said fitting member (10) such that said flange portion (124) of said fitting member (10) is stopped by means of said leg portion (61) of said positioning member (60), thereby fixing said fitting member (10) to said apparatus, said leg portion (61) having a snapping end (62) laterally formed of an upper portion thereof and abutting on an inner wall of said lug portion (31) defining said passage (32).

2. The tubing connection construction in accordance with claim 1, further comprising a projection (123) formed on the periphery of the first end portion (12) of said fitting member (10) and received in said passage (32) in said lug portion (31) to abut on said leg portion (61) of said positioning member (60).

3. The tubing connection construction in accordance with claim 1, further comprising an annular groove (121) defined in the periphery of the first end portion (12) of said fitting member (10) and communicating with said passage (32) in said apparatus, a sealing washer (50) mounted around said annular groove (121) and abutting on an inner wall of said apparatus defining said passage (32).

* * * * *